United States Patent
Strandborg et al.

(10) Patent No.: US 12,106,734 B1
(45) Date of Patent: Oct. 1, 2024

(54) HIDING LENS DISTORTIONS USING BLACK PIXELS

(71) Applicant: Varjo Technologies Oy, Helsinki (FI)

(72) Inventors: Mikko Strandborg, Hangonkylä (FI); Antti Hirvonen, Espoo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/513,723

(22) Filed: Nov. 20, 2023

(51) Int. Cl.
  *G06T 5/80* (2024.01)
  *G06F 3/01* (2006.01)
  *G09G 5/10* (2006.01)

(52) U.S. Cl.
  CPC ............... *G09G 5/10* (2013.01); *G06F 3/013* (2013.01); *G06T 5/80* (2024.01); *G09G 2320/0626* (2013.01)

(58) Field of Classification Search
  None
  See application file for complete search history.

(56) References Cited

U.S. PATENT DOCUMENTS

| | | | |
|---|---|---|---|
| 2002/0005862 A1* | 1/2002 | Deering | G09G 5/363 345/694 |
| 2013/0127980 A1* | 5/2013 | Haddick | G06F 3/013 348/14.08 |

* cited by examiner

*Primary Examiner* — Parul H Gupta
(74) *Attorney, Agent, or Firm* — Ziegler IP Law Group LLC.

(57) ABSTRACT

Disclosed is a display apparatus with gaze-tracking means, light source(s), eyepiece lens, and processor(s) configured to: process gaze-tracking data to determine a gaze direction; determine relative position of a pupil with respect to eyepiece lens and relative orientation (A) of the pupil with respect to optical axis (OO') of eyepiece lens; estimate distortions per pixel(s) in image, based on the relative position, the relative orientation and distortion information; identify an image segment whose pixels' estimated distortions are higher than predefined threshold distortion; modify image by replacing pixels of identified image segment with black pixels or near-black pixels; and utilise modified image for display to given eye via light source(s).

14 Claims, 2 Drawing Sheets

HIDING LENS DISTORTIONS USING BLACK PIXELS

TECHNICAL FIELD

The present disclosure relates to display apparatuses incorporating hiding lens distortions using black pixels. The present disclosure also relates to methods incorporating hiding lens distortions using black pixels.

BACKGROUND

In recent times, there has been an ever-increasing demand for image capturing and processing. Such a demand may, for example, be quite high and critical in case of immersive extended-reality (XR) environments, which are being employed in various fields such as entertainment, real estate, training, medical imaging operations, simulators, navigation, and the like. Such immersive XR environments are presented to a user of conventional display systems (such as an XR headset, a pair of XR glasses, or similar). Several advancements are being made to develop image capturing and processing technology.

However, existing imaging systems and devices employing camera(s) have several problems associated therewith. The existing imaging systems and devices are inefficient in terms of generating images that have an acceptably high visual quality (for example, in terms of high resolution) throughout. This is because a lens system employed in conventional display systems is typically optimized to work best when viewed along an optical axis of the lens system. Furthermore, when designing the lens system, a goal is such that an area or a volume around an ideal viewing position where a quality of an image is deemed sufficient, is as large as possible. However, as the lens systems are pushed towards their limits when designing advanced display systems, the quality falloff may be quite sudden. Moreover, when the display system is viewed towards edges of the field of view of the lens system, the lens system typically adds significant distortion and colour aberration to some areas of the picture. This distortion and colour aberration is corrected using conventional correction algorithms, which mitigates this problem (namely, this distortion and the colour aberration) up to a certain extent. However, the conventional display systems do not take a position of a user into account.

Figure 1A:
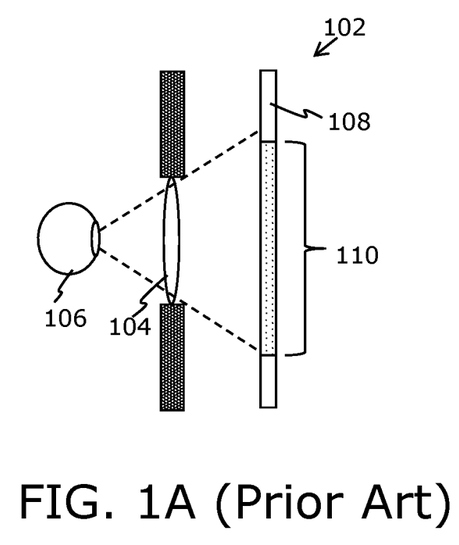
FIG. 1A (Prior Art) and FIG. 1B (Prior Art) illustrate exemplary visual reproductions of distortion experienced while using conventional display systems.
Figure 1B:
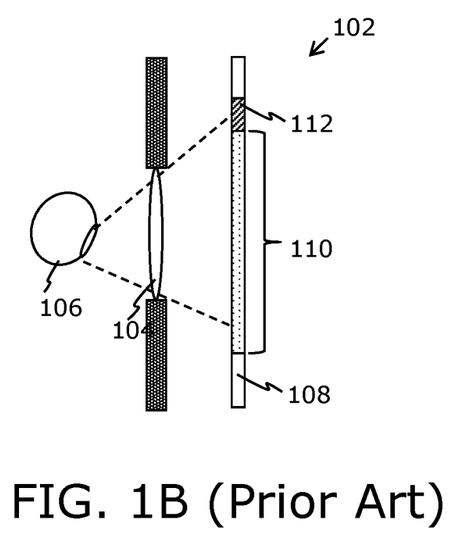

Referring to FIG. 1A (Prior Art) and FIG. 1B (Prior Art), illustrated are exemplary visual reproductions of distortion experienced while using conventional display systems. In an example, a conventional display system 102 comprises a lens system 104 arranged in front of an eye 106 of a user and a display panel 108. In FIG. 1A, a gaze of the eye 106 is forward which is an optimal viewing position, wherein a field of view 110 as shown on the display panel 108 is without any distortion. The conventional display system 102 is calibrated for the optimal viewing position.

In FIG. 1B, the distortions arises when the gaze of the eye 106 points downwards, hence a position of the eye 106 also moves slightly downwards. This causes the eye 106 to move away from the optimal viewing position for which the conventional display system 102 has been calibrated for, thereby causing distortions. Furthermore, as the eye 106 moves downwards, previously occluded area 112 at a top of the display panel 108 becomes visible, including areas that were not meant to be visible to the eye 106 of the user.

Therefore, in light of the foregoing discussion, there exists a need to overcome the aforementioned drawbacks.

SUMMARY

The aim of the present disclosure is to provide display apparatuses and methods incorporating hiding lens distortions using black pixels, to produce high-quality images by mitigating the distortions by replacing pixels with black pixels or near-black pixels dynamically. The aim of the present disclosure is achieved by display apparatuses and methods which incorporate hiding lens distortions using black pixels as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the first disclosure provides a display apparatus comprising:
   gaze-tracking means;
   at least one light source;
   an eyepiece lens arranged on an optical path of the at least one light source; and
   at least one processor configured to:
      process gaze-tracking data, collected by the gaze-tracking means, to determine a gaze direction of a given eye of a user;
      determine a relative position of a pupil of the given eye with respect to the eyepiece lens and a relative orientation (A) of the pupil of the given eye with respect to an optical axis (OO') of the eyepiece lens, based on at least one of: the gaze-tracking data, the gaze direction of the given eye;

estimate distortions per pixel or per group of pixels in an image, based on the relative position of the pupil, the relative orientation of the pupil and distortion information indicative of distortion caused by the eyepiece lens;

identify an image segment whose pixels' or groups of pixels' estimated distortions are higher than a predefined threshold distortion;

modify the image by replacing the pixels of the identified image segment with black pixels or near-black pixels; and utilise the modified image for display to the given eye via the at least one light source.

In a second aspect, the present disclosure provides a method incorporating hiding lens distortions using black pixels, the method implemented by a display apparatus comprising a gaze-tracking means, at least one light source, an eyepiece lens arranged on an optical path of the at least one light source, and at least one processor, the method comprising:

processing gaze-tracking data, collected by the gaze-tracking means, to determine a gaze direction of a given eye of a user;

determining a relative position of a pupil of the given eye with respect to the eyepiece lens and a relative orientation (A) of the pupil of the given eye with respect to an optical axis (OO') of the eyepiece lens, based on at least one of: the gaze-tracking data, the gaze direction of the given eye;

estimating distortions per pixel or per group of pixels in an image, based on the relative position of the pupil, the relative orientation of the pupil and distortion information indicative of distortion caused by the eyepiece lens;

identifying an image segment whose pixels' or groups of pixels' estimated distortions are higher than a predefined threshold distortion;

modifying the image by replacing the pixels of the identified image segment with black pixels or near-black pixels; and utilising the modified image for display to the given eye via the at least one light source.

The present disclosure provides the aforementioned display apparatus and the aforementioned method to mitigate distortions caused by the eyepiece lens. In this regard, at extreme edges of the eyepiece lens, the image starts to fold back on itself, which is mitigated by applying a blocking mask to the edges of the eyepiece lens. This removes the visual artifacts when looking at the eyepiece lens at an optimal viewing position, wherein the optical viewing position is obtained when an eye axis (as described later) of the user's eye coincides with an optical axis (as described later) of the eyepiece lens. However, the visual artifacts reappear when the user is off the optimal viewing position, such as when turning the eye. These visual artifacts appear as distortions in the image when the image is displayed to the user via the at least one light source. This distortion is compensated by modifying the image based on the gaze of the user. The distortions are estimated dynamically, as the distortions can be anywhere at the periphery of the eyepiece lens, based on the relative position of the pupil, the relative orientation of the pupil and the distortion information. The pixels in the identified image segment is replaced by the black pixels' or near black pixels' in a dynamic manner, so that area is not visible to the user's eyes. Hence, a viewing experience of a user would become highly immersive and realistic when the image is subsequently shown to the user.

The imaging system and the method are simple, robust, fast, reliable and can be implemented with ease.

Throughout the present disclosure, the term "display apparatus" refers to a specialized equipment that is configured to present images and/or videos to a user when the display apparatus is in operation. The display apparatus acts as a device that is operable to present a visual scene of an environment (for example, such as an extended-reality environment) to the user.

Throughout the present disclosure, the term "gaze-tracking means" refers to a specialized equipment for detecting and/or following the gaze of the user, when the display apparatus in operation is worn by the user. The gaze-tracking means could be implemented as contact lenses with sensors, cameras monitoring a position, a size and/or shape of a pupil of a given eye of the user, and the like. Such gaze-tracking means are well-known in the art. The gaze-tracking means is configured to collect gaze-tracking data, which constitutes information indicative of the gaze direction of the user. Then, the gaze-tracking means sends the gaze-tracking data (i.e., said information) to the at least one processor.

Throughout the present disclosure, the term "light source" refers to an element from which light emanates. The at least one light source is driven to display a sequence of images. Optionally, a given light source is implemented as a display. In this regard, the modified image is displayed at the display. Examples of such a display may include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, the given light source is implemented as a projector. In this regard, a modified image is projected onto a projection screen or directly onto a retina of the user's eyes. Examples of such a projector may include, but are not limited to, an LCD-based projector, an LED-based projector, an OLED-based projector, an LCOS-based projector, a Digital Light Processing (DLP)-based projector, and a laser projector.

Throughout the present disclosure, the term "eyepiece lens" refers to an optical element in the display apparatus which is used to display (namely, present) visual information generated by the at least one light source of the display apparatus to the user's eyes. The eyepiece lens is arranged to per eye of the user, when the display apparatus is worn by the user. The eyepiece lens is arranged on the optical path of the at least one light source to focus the light from the at least one light source to form a clear image. Moreover, the eyepiece lens influences a field of view experienced by the user.

Optionally, the eyepiece lens is implemented as a single lens having a complex shape. As an example, such an eyepiece lens may have an aspheric shape. Optionally, the single lens is implemented as any of: a Fresnel lens, a Liquid Crystal (LC) lens, a liquid lens.

Notably, the at least one processor controls an overall operation of the display apparatus. It will be appreciated that the at least one processor is communicably coupled to the gaze-tracking means, the at least one light source and the eyepiece lens. The at least one processor could be implemented as any one of: an image signal processor, a microprocessor, a microcontroller, or a controller. As an example, the image signal processor may be a programmable digital signal processor (DSP). As another example, the at least one processor could be implemented as an application-specific integrated circuit (ASIC) chip or a reduced instruction set computer (RISC) chip. The processing steps of the at least one processor have been recited with respect to a given eye (as well as a given eyepiece lens corresponding to the given eye). The term "given eye" encompasses both the first eye and the second eye.

The gaze-tracking data collected by the gaze-tracking means is sent to the at least one processor to extract relevant features to determine the gaze directions of the given eye. The term "gaze direction" refers to a direction in which the given eye of the user is gazing. The gaze direction may be represented by a gaze vector. It will be appreciated that when user's gaze is directed (namely, focused) towards a point or a region within the given real-world scene, a gaze direction of the first eye and the gaze direction of the second eye are different from each other, and both the gaze directions will converge at said point or said region. The first eye is one of a left eye or a second eye of the user, while the second eye is another of the right eye or the left eye of the user. The gaze-tracking data may comprise images of the given eye of the user, sensor values, and the like. Optionally, when processing the gaze-tracking data to determine the gaze direction of the given eye, the at least one processor is configured to employ at least one of: an image processing algorithm, a feature extraction algorithm, a data processing algorithm. It will be appreciated that the gaze-tracking data is collected repeatedly by the gaze-tracking means throughout a given session of using the display apparatus, as gaze of the user's eyes keeps changing whilst heshe uses the display apparatus. An up-to-date gaze-tracking data (indicative of a gaze direction of the given eye of the user) allows for generating up-to-date gaze-contingent image(s).

The position and orientation of the pupil changes according to a change in a position and orientation of the given eye. The at least one processor is configured to determine the relative position of the pupil of the given eye with respect to the eyepiece lens. The relative position of the pupil of the given eye is indicative of an offset between a position of the pupil and a position of the eyepiece lens. In this regard, the eye-tracking data could comprise coordinates of the position of the pupil of the given relative to the position of the eyepiece lens. Simultaneously, the at least one processor is configured to determine the relative orientation of the pupil of the given eye, wherein the relative orientation can be determined as an angle between a given optical axis of the given eyepiece lens and an eye axis of the given eye. Herein, the term "optical axis" refers to an imaginary line along that passes through the optical centre of the eyepiece lens, through which light propagates within the display apparatus. The term "eye axis" refers to another imaginary line passing through the pupil and a centre of the given eye. It will be appreciated that all angles (including the relative orientation) between the given optical axis and the eye axis of the given eye, is measured with respect to a centre of the given eye (namely, a centre of a spherical shape of the given eye). Herein, greater the angular distance of the eye axis from the optical axis of the eyepiece lens, farther away is the gaze region of the given eye from the optical axis of the eyepiece lens, and vice versa.

When the pupil of the given eye is at the centre and the given eye looks straight-ahead through a centre of the eyepiece lens, the eye axis of the given eye aligns with the optical axis of the eyepiece lens. This indicates that the given eye is positioned directly in front of the eyepiece lens along a same line of sight as the optical axis, and there is no angular deviation between the given eye and the eyepiece lens. Furthermore, the gaze direction of the given eye aligns with the direction of the optical axis.

When the pupil of the given eye moves, the eye axis of the given eye does not align with the optical axis of the eyepiece lens. This indicates that even though the given eye is positioned directly in front of the eyepiece lens, however, the given eye does not have the same line of sight as the optical axis. Hence, there is an angular deviation between the given eye and the eyepiece lens. Furthermore, the gaze direction of the given eye is aligned differently to the direction of the optical axis.

It will be appreciated that during calibration, the optical axis of the eyepiece lens may not coincide with the eye axis of the given eye. In such an instance, the given eye may be looking straight-ahead, but the optical axis of the eyepiece lens is skewed at a particular angle. This particular angle is not the relative orientation of the pupil of the given eye with respect to the optical axis.

In this regard, the gaze-tracking data comprises information regarding position and movement of the pupil of the given eye, which can be used to calculate spatial coordinates of the pupil with respect to the eyepiece lens. Additionally, the gaze direction of the given eye can be used to map said gaze direction to the optical axis of the eyepiece lens. Herein, the at least one processor is configured to employ any one of: a mathematical model, a pose (wherein pose encompasses both position and orientation) data extrapolation algorithm.

For example, the gaze-tracking data may comprise eye images. An analysis of the eye images can be performed to determine the relative position of the pupil.

It will be appreciated that the eye is not necessarily positioned exactly at the optical axis, due to the user's head shape, positioning of the display apparatus, a gaze location of the user (as pupil moves sideways as the given eye rotates). The relative position of the pupil relative to the eyepiece lens determines which areas of the eyepiece lens and the display apparatus are visible, and the relative orientation of the eye determines a subset of those areas that are within the field of view of the given eye. Due to the dynamic nature of the relative position of the given eye, there may be arbitrary locations in the display apparatus that show visual artifacts. However, such visual artifacts occur when the relative orientation exceeds a predefined angle, as described later.

The image of a real-world environment is captured by a camera, wherein the camera is further comprised in the display apparatus. Herein, the camera is operable to detect and process light signals received from the real-world environment, so as to capture image(s) of the real-world environment. Optionally, the camera is implemented as a visible-light camera or a combination of a visible-light camera and a depth camera. Such visible-light cameras and depth cameras are well-known in the art. The "image" is a visual representation of the real-world environment, which encompasses not only colour information represented in the image, but also other attributes associated with the image (for example, such as, depth information, transparency information, luminance information, brightness information, and the like).

When the image is captured by the camera, a distortion (i.e., an optical aberration) is introduced in the in the image due to optical properties and/or arrangement of components (for example, the eyepiece lens) of the camera, closeness of a targeted region within a real-world environment and the camera, and other factors. This distortion could be a negative distortion (namely, a barrel distortion or a fisheye distortion), or a positive distortion (namely, a pincushion distortion). The aforesaid types of distortion are well-known in the art.

The at least one processor is configured to determine an average distortion of the pixel or the group of pixels in the image. Herein, the group of pixels could comprise a matrix of 2 by 2 pixels, 4 by 4 pixels, 3 by 6 pixels, and similar. It will be appreciated that the average distortion is determined as an average (namely, a mean) of the negative distortion and the positive distortion across an entirety of the field of view of the eyepiece lens. Moreover, the distortions can also be estimated for groups of neighbouring pixels. In this regard, the relative position and the relative orientation of the pupil can be used as a reference to determine how distortions manifest, within the image, based on different gaze directions of the user's eyes. The distortions appear when the given eye of the user is off an optimal viewing position, i.e., when the eye axis of the given eye does not align with the optical axis of the eyepiece lens. Moreover, the at least one processor is configured to estimate the distortions based on the distortion information, wherein the distortion information comprises distortion coefficients. These distortion coefficients are measured during calibration of the display apparatus, as described below.

Optionally, the at least one processor is configured to collect the distortion information indicative of the distortion caused by the eyepiece lens during calibration of the display apparatus. In other words, the at least one processor is configured to collect the distortion information during an initial calibration of the display apparatus, according to the user's eyes. In such a case, the gaze-tracking means is employed to generate the gaze-tracking data for the user's eyes during the initial calibration of the display apparatus. Optionally, in this regard, the gaze-tracking means is employed to collect the gaze-tracking data of the given eye of the user, when the user views at least one reference image during the calibration of the display apparatus. Herein, the term "reference image" refers to an image that is to be used for calibrating the display apparatus according to the user's eyes. Optionally, in this regard, the at least one reference image presents to the user a given visual target at a particular location and a particular optical depth. Herein, the visual target is a visible mark (namely, a spot) represented within the at least one reference image. Notably, the given visual target is distinctly visible in the at least one reference image. Optionally, in the at least one reference image, the given visual target may be represented at a central portion, a corner portion, a top portion, a right side portion, and the like, of a field of view of the user. Since the processor controls displaying of the at least one reference image, the given location and the given optical depth of the given visual target are already known to the processor. In this regard, the at least one processor is configured to collect the distortion information, by comparing the at least one reference image with an image produced at a retina of the given eye (or at an exemplary camera arranged approximately arranged at a position where the given eye may be arranged), when the display apparatus is in operation. A technical effect of collecting the distortion information in such a manner is that it facilitates understanding irregularities introduced by the eyepiece lens, which can be used to develop techniques to enhance an overall quality of the image.

Throughout the present disclosure, the term "image segment" of the image refers to a part of the image that corresponds to distorted pixels' or groups of pixels. It will be appreciated that the image segment of the image may or may not have a defined shape and/or size. The at least one processor is configured to employ at least one feature-extraction algorithm to identify the image segment. The estimated distortions of the pixels' or groups of pixels' are compared with the predefined threshold distortion, to identify locations within the image that are distorted. The predefined threshold distortion indicates that a limit of acceptable level of distortions allowed in the image. Hence, the pixels' or groups of pixels' within the image that have estimated distortions higher than the predefined threshold are indicative of areas with significant distortion. Such image segments are further processed (as described later) to improve an overall quality of the image. Resultantly, this improves the viewing experience of the user. A unit of measurement for distortions per pixel or per group of pixels may be expressed in decibels peak Signal-to-Noise Ratio (dB pSNR), wherein the pSNR value expressed in dB, provides a quantitative measure of how much distortion is present in the image compared to highest possible quality of the image. Herein, a higher pSNR value indicates better image quality or less distortion.

Optionally, the predefined threshold distortion lies in a range of 3 dB pSNR to 15 dB pSNR. The predefined threshold distortion lies in a range of 3, 4, 5, or 10 dB pSNR to 8, 11, 13, 14, or 15 dB pSNR. Hence, the estimated distortions per pixel or per group of pixels is within acceptable limits when the estimated distortion lies within this range. A technical effect of the predefined threshold distortion is that it can be used to implement further processing of the image to enhance the quality of the image, to provide a better viewing experience to the user, when the display apparatus is in use.

The at least one processor is configured to mask or conceal the pixels' or groups of pixels' that are distorted, by making it appear as a darkened area in the image. The replacement of pixels' or groups of pixels' with black pixels or near-black pixels' is utilised to hide or minimise a visibility of the image segment that has a high distortion (i.e., the estimated distortions exceed the predefined threshold distortion). Herein, an intensity of the pixel indicates how dark each pixel in the image segment is, depending on a number of bits used to indicate a value of a colour component in the pixel in the image segment. When the number of bits is high, the colour component is at a darkest end (i.e., black colour), and when the number of bits is low, the colour component is at a lightest end (i.e., white colour). The number of bits may be, but not limited to, 8 bits, bits, 12 bits, 16 bits, 24 bits, and so on. As an example, when the number of bits is 8 bits, the values of the pixels or groups of pixels in the image segment is replaced with those pixels which lie in a range of 0-255 and is chosen from amongst a total of 256 values. As another example, when the number of bits is 10 bits, the values of the pixels in the grayscale image lies in a range of 0-1023 and is chosen from amongst a total of 1024 values.

Herein, the term "black pixels" refers to the colour component with all pixel values set to zero. As an example, when the number of bits is 8 bits, the pixel value of black colour may be (0, 0, 0). The term "near-black pixels" refers to pixels whose pixel values are close to the pixel values of the black pixels, but not entirely black. Such near-black pixels have pixel values that are slightly higher than zero and produce a dark shade that is close to black. As an example, the near-black pixels are defined in terms of percentage depending on a size of a bit or float representation used for the colour component of the pixel in the identified image segment. For example, when the number of bits is 8 bits, the pixel value of black colour may be (1, 1, 1) or (2, 2, 2), or any combination where Red-Green-Blue values are low but not zero.

The at least one processor is configured to send electrical signals (namely, current signals and/or voltage signals) to the at least one light source, to provide illumination to present the modified image by enabling projection or presentation of the modified image. The modified image is projected or displayed onto the given eye of the user through the eyepiece lens, that directs the modified image towards the given eye of the user. It will be appreciated that when no distortions are estimated per pixel or per group of pixels in the image, the image in its original form is utilized for display to the given eye via the at least one light source.

Optionally, the at least one processor is configured to:
  detect when the relative orientation of the pupil is greater than a predefined angle;
  when it is detected that the relative orientation of the pupil is greater than the predefined angle,
  determine a gaze point (X) in the image, based on the gaze direction of the given eye; and
  when identifying the image segment, consider a given image segment whose pixels' angular distance (D) from the gaze point is greater than a pre-determined angular distance and whose pixels' or groups of pixels' estimated distortions are higher than the predefined threshold distortion as the identified image segment.

In this regard, when the gaze of the user is at an extreme edge of the field of view presented to the user via the eyepiece lens, the image segment is identified at another extreme edge that is diametrically opposite to the extreme edge. Herein, the relative orientation of the pupil is compared with the predefined angle. The predefined angle depends on the field of view that is presented to the user via the at least one light source, and a distortion profile of the eyepiece lens. Optionally, the predefined angle lies in a range of 10 degrees to 35 degrees. The predefined angle lies in a range of 10, 15, or 25 degrees to 20, 30, or 35 degrees. As a first example, for a field of view of 120 degrees, the predefined angle could lie in a range of 15 degrees to 25 degrees. This range may be considered to take care of distortion only when the user is viewing at extremities.

Subsequently, when the relative orientation of the pupil is greater than the predefined angle, that means the gaze direction of the given eye is such that the user is viewing at the extremities. In this regard, the term "gaze point" refers to a point in the real-world environment at which the user's gaze is focused. The gaze point is a point of interest of the user, in the real-world environment. Optionally, the gaze point is determined by mapping the gaze direction of the given eye of the user to a corresponding point in the real-world environment, at which the gaze directions of the first eye and the gaze directions of the second eye converge.

Herein, the gaze point is considered to be a reference point when determining the given image segment from the gaze point. The angular distance (D) of the pixels of the given image segment is compared with the pre-determined angular distance, while the estimated distortions in the identified image segment are higher than the predefined threshold distortion. This condition pertains to a fact that only those pixels' or groups of pixels' in the image segment need to be blacked out (or nearly-blacked out) when they lie opposite to the gaze point. Moreover, the pre-determined angular distance would be greater than or equal to twice the predefined angle. Continuing with reference to the first example, if the predefined angle is equal to 40 degrees, the pre-determined angular distance could be 80 degrees or more.

A technical effect of identifying the image segment in such a manner is that the visual artifacts in the image displayed to the user are mitigated when the eye axis of the user does not align with the optical axis of the user and is diametrically opposite to the gaze point of the given eye.

Optionally, the at least one light source is at least one display comprising a backlight, wherein the at least one processor is configured to dim a brightness of a part of the backlight that corresponds to the identified image segment of the image. Herein, the term "backlight" refers to illumination that is emanated from behind the at least one display of the at least one light source, when viewed from a perspective of the user. The light emanating from the backlight, after passing through the eyepiece lens, enables production of the image or the modified image by the at least one light source. The backlight comprises an array of light-emitting diodes (LEDs), which can be at least individually controlled, to control lighting of the part of the backlight that corresponds to the identified image segment of the image. In this regard, the at least one processor is configured to generate electrical signals (namely, current signals and/or voltage signals) to adjust the brightness (namely, an intensity) of the backlight, and send the electrical signals to the at least one light source. Herein, the brightness of the backlight is dimmed selectively, targeting the part of the backlight which corresponds to the identified image segment, to subdue a visual appearance of the pixels' or the groups of pixels' in the identified image segment. A technical effect of dimming the brightness of the backlight in such a manner is that the distortion arising due to the eyepiece lens and any colour aberration is mitigated, by reducing the visibility of the visual artifacts and the distortions. This also saves processing resources, as less power is consumed for the backlight to function.

Optionally, when modifying the image, the at least one processor is configured to replace additional pixels that lie in a proximity of a first edge of the identified image segment with black pixels or near-black pixels, the first edge being closer to a gaze point than a second edge of the identified image segment that is opposite to the first edge, wherein a density of the additional pixels that are replaced decreases on going away from the first edge. In this regard, the additional pixels are replaced to provide a smooth fade to black when the estimated distortions of the pixels' or groups of pixels exceeds the predefined threshold distortion. A technical effect is that such replacement of additional pixels is utilized to prevent displaying of sudden edges when the display apparatus is in use, thus improving the visual experience of the user.

Herein, the identified image segment has two edges, namely, the first edge and the second edge. The at least one processor is configured to prioritize the replacement of the additional pixels lying in the proximity of the first edge, as they are closer to the gaze point. Such additional pixels are replaced with the black pixels or the near-black pixels in a gradient manner, wherein the density of the replaced pixels diminishes gradually when going away from the first edge towards the second edge. This produces a fading effect, which allows for blending with actual colours near the first edge.

Optionally, the at least one light source is at least one display comprising a backlight, wherein the at least one processor is configured to:

dim a brightness of a part of the backlight that corresponds to the identified image segment of the image; and dim a brightness of an additional part of the backlight that corresponds to the additional pixels, wherein said part of the backlight is dimmed to a greater extent than the additional part of the backlight.

In this regard, the at least one processor is configured to generate electrical signals to adjust the brightness of the part of the backlight that corresponds to the identified image segment of the image, while simultaneously adjusting the additional part of the backlight corresponding to the additional pixels, and send the electrical signals to the at least one light source. The differential dimming of the backlight corresponding to the image segment of the image and the additional pixels is utilised to prioritize modification of the identified image segment, wherein the additional part is dimmed to a lesser extent than said part of the backlight, as they are deemed less critical for modification. Hence, the image is selectively modified. A technical effect of dimming the brightness in such a manner is that the distortions exceeding the predefined threshold distortion are mitigated while minimizing unnecessary modifications in surrounding areas of the identified image segment, thus saving processing resources.

Optionally, said image is a virtual-reality (VR) image, the display apparatus further comprising at least one video-see-through (VST) camera, wherein the at least one processor is configured to:

determine a region in a field of view of the at least one VST camera corresponding to the identified image segment of the image;

skip reading out from the determined region in the field of view of the at least one VST camera, whilst reading out image data from a remaining region in the field of view of the at least one VST camera;

process the image data to generate a VST image;

generate an extended-reality (XR) image by utilising the VST image and the VR image; and display the XR image via the at least one light source.

The term "virtual-reality image" refers to an image that is captured to be viewed within a virtual-reality environment provided when the display apparatus is in use. The term "video-see-through camera" refers to an equipment that is operable to detect and process light signals from the real-world environment, to capture RGB images of the real-world environment. The VST camera overlays images onto the field of view of the user based on a pose of the display apparatus, on a transparent or a semi-transparent display, to create the XR image. The VST camera captures sharp RGB images of the real-world environment. It will be appreciated that there can be several VR images (generated by different rendering applications) that can be employed with the VST image to generate the XR image.

In this regard, the at least one processor is configured to map the region within the field of view of the at least one VST camera that corresponds to the identified image segment of the image, to establish a spatial relationship between the identified image segment and the real-world environment as captured by at least one VST camera. It will be appreciated that the image data is read out sequentially, which is well-known in the art. Herein, the term "image data" refers to information pertaining to a given photo-sensitive cell of the at least one VST camera, wherein said information comprises one or more of: a colour value, a depth, a luminance value. In some implementations, the image data is RAW image data that has been read out from an image sensor of a given VST camera. The term RAW image data refers to the image data that is unprocessed (or may be minimally processed) when obtained from the image sensor. The RAW form of the image data is well-known in the art. In other implementations, the image data is partially-processed image data that is generated upon performing certain image signal processing (ISP) on the RAW image data, for example, in an ISP pipeline.

Notably, the at least one VST camera reads image data from only the remaining region in the field of view which corresponds with the undistorted portions of the image. This means that a visual information of the determined region is excluded or not processed when processing the image data. Moreover, the at least one processor is configured to employ an occlusion mesh which is adjusted dynamically, so the image data from the determined regions is not rendered (i.e., the read out of the image data is skipped) for the determined region. Such determined region is typically located at extreme edges of the field of view of the at least one VST camera. In particular, the determined region is at an opposite end of the field of view of the at least one VST camera where the gaze of the given eye has been turned to. Hence, a degradation of the field of view of the at least one VST camera is kept to a minimum.

Subsequently, the at least one processor is configured to employ image processing algorithms to process the image data to generate the VST image. Consequently, both the VR image and the VST image are combined to generate the XR image, when the at least one processor employs augmentation techniques, which are well-known in the art. The at least one processor is configured to generate electrical signals to display the XR image, and send the electrical signals to the at least one light source. The XR image is displayed to the user when the display apparatus is in use.

As an example, when the gaze of the given eye of the user may be at an extreme right of the field of view of at least one VST camera, the user may see distortions (such as, sudden movement) at an extreme left periphery of the field of the view. The image data of the pixels corresponding to the extreme left periphery may not be read out, so the user may not notice anything out of ordinary. As another example, when the gaze of the given eye of the user may be at an extreme lower-left corner of the field of view, there may not be sufficient image data available to fill an extreme upper-right corner of the screen. Alternatively, the image data may be of such low quality, that it is beneficial to not show it at all (i.e., the image data may not be read out) to prevent flickering.

A technical effect of generating and displaying the XR image in such a manner is that said XR image forms an immersive environment where virtual and real objects coexist, with minimal distortions, thus providing users with an interactive experience.

The present disclosure also relates to the second aspect as described above. Various embodiments and variants disclosed above, with respect to the aforementioned first aspect, apply mutatis mutandis to the second aspect. The method is implemented by display apparatus comprising a gaze-tracking means, at least one light source, an eyepiece lens, and at least one processor.

Optionally, the method comprises:

detecting when the relative orientation of the pupil is greater than a predefined angle;

when it is detected that the relative orientation of the pupil is greater than the predefined angle, determining a gaze point (X) in the image, based on the gaze direction of the given eye; and when identifying the image segment, considering a given image segment whose pixels' angular distance (D) from the gaze point is greater than a predetermined angular distance and whose pixels' or groups of pixels' estimated distortions are higher than the predefined threshold distortion as the identified image segment.

A technical effect of identifying the image segment in such a manner is that the visual artifacts in the image displayed to the user is mitigated when the eye axis of the user does not align with the optical axis of the user, and is diametrically opposite to the gaze point of the given eye.

Optionally, the method comprises collecting the distortion information indicative of the distortion caused by the eyepiece lens during calibration of the display apparatus.

A technical effect of collecting the distortion information in such a manner is that it facilitates understanding irregularities introduced by the eyepiece lens, which can be used to develop techniques to enhance an overall quality of the image.

Optionally, the at least one light source is at least one display comprising a backlight, wherein the method comprises dimming a brightness of a part of the backlight that corresponds to the identified image segment of the image.

A technical effect of dimming the brightness of the backlight in such a manner is that the distortion arising due to the eyepiece lens and any colour aberration is mitigated, by reducing the visibility of the visual artifacts and the distortions. This also saves processing resources, as less power is consumed for the backlight to function.

Optionally, when modifying the image, the method comprises replacing additional pixels that lie in a proximity of a first edge of the identified image segment with black pixels or near-black pixels, the first edge being closer to a gaze point than a second edge of the identified image segment that is opposite to the first edge, wherein a density of the additional pixels that are replaced decreases on going away from the first edge.

A technical effect is that such replacement of additional pixels is utilized to prevent displaying of sudden edges when the display apparatus is in use, thus improving the visual experience of the user.

Optionally, the at least one light source is at least one display comprising a backlight, the method comprising:
  dimming a brightness of a part of the backlight that corresponds to the identified image segment of the image; and
  dimming a brightness of an additional part of the backlight that corresponds to the additional pixels,
wherein said part of the backlight is dimmed to a greater extent than the additional part of the backlight.

A technical effect of dimming the brightness in such a manner is that the distortions exceeding the predefined threshold distortion are mitigated while minimizing unnecessary modifications in surrounding areas of the identified image segment, thus saving processing resources.

Optionally, said image is a virtual-reality (VR) image, the display apparatus further comprising at least one video-see-through (VST) camera, wherein the method comprises:
  determine a region in a field of view of the at least one VST camera corresponding to the identified image segment of the image;
  skip reading out from the determined region in the field of view of the at least one VST camera, whilst reading out image data from a remaining region in the field of view of the at least one VST camera;
  process the image data to generate a VST image;
  generate an extended-reality (XR) image by utilising the VST image and the VR image; and
  display the XR image via the at least one light source.

A technical effect of generating and displaying the XR image in such a manner is that said XR image forms an immersive environment where virtual and real objects coexist, with minimal distortions, thus providing users with an interactive experience.

DETAILED DESCRIPTION OF THE DRAWINGS

Figure 2:
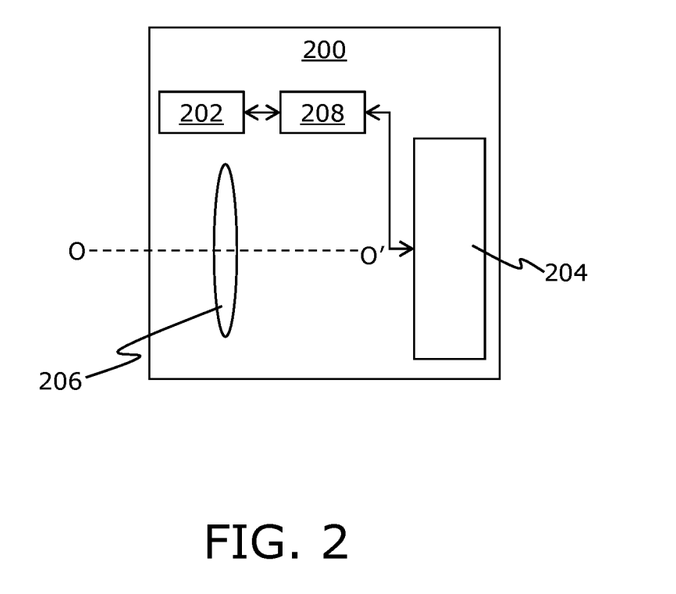
FIG. 2 illustrates is a block diagram of an architecture of a display apparatus, in accordance with an embodiment of the present disclosure.

Referring to FIG. 2, illustrated is a block diagram of an architecture of a display apparatus 200, in accordance with an embodiment of the present disclosure. The display apparatus 200 comprises a gaze-tracking means 202, at least one light source (depicted as a light source 204), an eyepiece lens 206, and at least one processor (depicted as a processor 208). The eyepiece lens 206 is arranged on an optical path of the light source 204. The processor 208 is communicably coupled with the gaze-tracking means 202, and the light source 204. The processor 208 is configured to perform various operations, as described earlier with respect to the aforementioned first aspect.

It may be understood by a person skilled in the art that the FIG. 2 includes a simplified architecture of the display apparatus 200 for sake of clarity, which should not unduly limit the scope of the claims herein. It is to be understood that the specific implementation of the display apparatus 200 is provided as an example and is not to be construed as limiting it to specific numbers or types of light sources and processors. The person skilled in the art will recognize many variations, alternatives, and modifications of embodiments of the present disclosure.

Figure 3A:
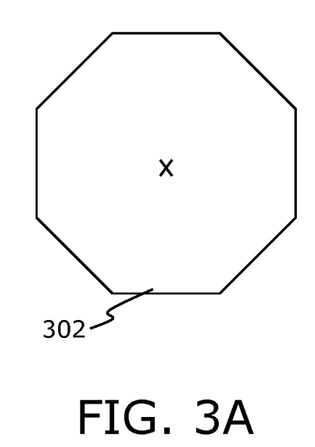
FIGS. 3A, 3B and 3C show exemplary implementations of hiding lens distortions using black pixels, when a display apparatus of FIG. 2 is in use, in accordance with an embodiment of the present disclosure.
Figure 3B:
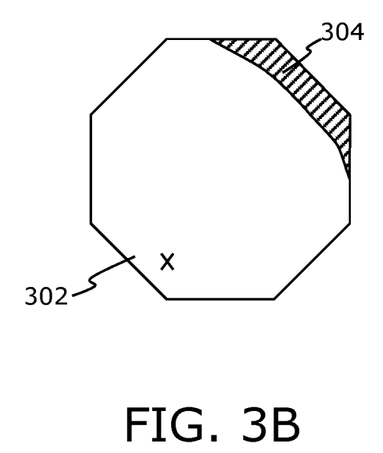
Figure 3C:
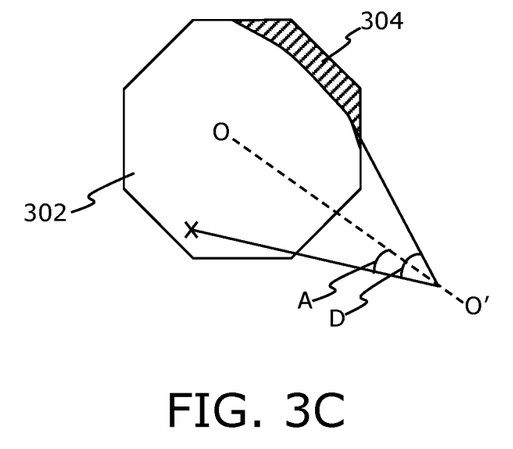

Referring to FIGS. 3A, 3B and 3C, there are shown exemplary implementations of hiding lens distortions using black pixels, when a display apparatus 200 of FIG. 2 is in use, in accordance with an embodiment of the present disclosure. In FIGS. 3A, 3B and 3C, there is shown an image 302 as presented by the eyepiece lens 206. In FIG. 3A, when an eye axis of user's eye coincides with an optical axis of the eyepiece lens 206, it is deemed to be normal view. The user gazes at a location in the image 302, wherein gaze directions of the user's eyes are tracked by the gaze-tracking means 202. The processor 208 is configured to determine the gaze point X by processing the gaze directions. In FIG. 3B, a relative position of a pupil of a given eye is with respect to the eyepiece lens 206 and in FIG. 3C, a relative orientation A of the pupil of the given eye is with respect to the optical axis OO' of the eyepiece lens, wherein the relative position and the relative orientation of the pupil changes and shifts to an extreme lower left corner of the image 302. Hence, an opposite edge (depicted as an extreme upper right corner of the image 302) is distorted. In both the FIGS. 3B and 3C, a gaze point X is determined. Such distorted pixels' or groups of pixels' in the extreme upper right corner of the image 302, whose estimated distortions are higher than a predefined threshold distortion, are identified as an image segment 304. The pixels in the image segment 304 are replaced by black pixels or near-black pixels. In FIG. 3C, it is detected that the relative orientation A of the pupil is greater than a predefined angle. When identifying the image segment 304, that image segment is considered whose pixels' angular distance D from the gaze point X is greater than a pre-determined angular distance and whose pixels' or groups of pixels' estimated distortions are higher than the predefined threshold distortion as the identified image segment. Herein, the pre-determined angular distance would be greater than or equal to twice the predefined angle.

FIGS. 3A-3C are merely examples, which should not unduly limit the scope of the claims herein. A person skilled in the art will recognize many variations, alternatives, and modifications of embodiments of the present disclosure.

Figure 4:
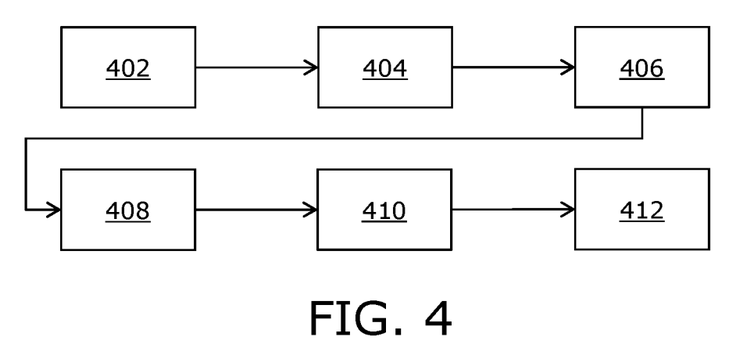
FIG. 4 illustrates steps of a method incorporating hiding lens distortions using black pixels, in accordance with an embodiment of the present disclosure.

Referring to FIG. 4, illustrated are steps of a method incorporating hiding lens distortions using black pixels, in accordance with an embodiment of the present disclosure. The method is implemented by a display apparatus comprising a gaze-tracking means, at least one light source, an eyepiece lens arranged on an optical path of the at least one light source, and at least one processor. At step 402, gaze-tracking data is processed, collected by the gaze-tracking means, to determine a gaze direction of a given eye of a user. At step 404, a relative position of a pupil of the given eye is determined, with respect to the eyepiece lens and a relative orientation (A) of the pupil of the given eye with respect to an optical axis (OO') of the eyepiece lens, based on at least one of: the gaze-tracking data, the gaze direction of the given eye. At step 406, distortions per pixel or per group of pixels in an image are estimated, based on the relative position of the pupil, the relative orientation of the pupil and distortion information indicative of distortion caused by the eyepiece lens. At step 408, an image segment is identified, whose pixels' or groups of pixels' estimated distortions are higher than a predefined threshold distortion. At step 410, the image is modified, by replacing the pixels of the identified image segment with black pixels or near-black pixels. At step 412, the modified image is utilised for display to the given eye via the at least one light source.

The aforementioned steps are only illustrative and other alternatives can also be provided where one or more steps are added, one or more steps are removed, or one or more steps are provided in a different sequence without departing from the scope of the claims herein.

The invention claimed is:

1. A display apparatus comprising:
 gaze-tracking means;
 at least one light source;
 an eyepiece lens arranged on an optical path of the at least one light source; and
 at least one processor configured to:
  process gaze-tracking data, collected by the gaze-tracking means, to determine a gaze direction of a given eye of a user;
  determine a relative position of a pupil of the given eye with respect to the eyepiece lens and a relative orientation of the pupil of the given eye with respect to an optical axis of the eyepiece lens, based on at least one of: the gaze-tracking data, the gaze direction of the given eye;
  estimate distortions per pixel or per group of pixels in an image, based on the relative position of the pupil, the relative orientation of the pupil and distortion information indicative of distortion caused by the eyepiece lens;
  identify an image segment whose pixels' or groups of pixels' estimated distortions are higher than a predefined threshold distortion;
  modify the image by replacing the pixels of the identified image segment with black pixels or near-black pixels; and
  utilise the modified image for display to the given eye via the at least one light source.

2. The display apparatus of claim 1, wherein the at least one processor is configured to:
 detect when the relative orientation of the pupil is greater than a predefined angle;
 when it is detected that the relative orientation of the pupil is greater than the predefined angle,
  determine a gaze point in the image, based on the gaze direction of the given eye; and
  when identifying the image segment, consider a given image segment whose pixels' angular distance from the gaze point is greater than a pre-determined angular distance and whose pixels' or groups of pixels' estimated distortions are higher than the predefined threshold distortion as the identified image segment.

3. The display apparatus of claim 1, wherein the at least one processor is configured to collect the distortion information indicative of the distortion caused by the eyepiece lens during calibration of the display apparatus.

4. The display apparatus of claim 1, wherein the at least one light source is at least one display comprising a backlight, wherein the at least one processor is configured to dim a brightness of a part of the backlight that corresponds to the identified image segment of the image.

5. The display apparatus of claim 1, wherein when modifying the image, the at least one processor is configured to replace additional pixels that lie in a proximity of a first edge of the identified image segment with black pixels or near-black pixels, the first edge being closer to a gaze point than a second edge of the identified image segment that is opposite to the first edge, wherein a density of the additional pixels that are replaced decreases on going away from the first edge.

6. The display apparatus of claim 5, wherein the at least one light source is at least one display comprising a backlight, wherein the at least one processor is configured to:
 dim a brightness of a part of the backlight that corresponds to the identified image segment of the image; and
 dim a brightness of an additional part of the backlight that corresponds to the additional pixels,
 wherein said part of the backlight is dimmed to a greater extent than the additional part of the backlight.

7. The display apparatus of claim 1, wherein said image is a virtual-reality (VR) image, the display apparatus further comprising at least one video-see-through (VST) camera, wherein the at least one processor is configured to:
 determine a region in a field of view of the at least one VST camera corresponding to the identified image segment of the image;
 skip reading out from the determined region in the field of view of the at least one VST camera, whilst reading out image data from a remaining region in the field of view of the at least one VST camera;
 process the image data to generate a VST image;
 generate an extended-reality (XR) image by utilising the VST image and the VR image; and
 display the XR image via the at least one light source.

8. A method incorporating hiding lens distortions using black pixels, the method implemented by a display apparatus comprising a gaze-tracking means, at least one light source, an eyepiece lens arranged on an optical path of the at least one light source, and at least one processor, the method comprising:
 processing gaze-tracking data, collected by the gaze-tracking means, to determine a gaze direction of a given eye of a user;
 determining a relative position of a pupil of the given eye with respect to the eyepiece lens and a relative orientation of the pupil of the given eye with respect to an optical axis of the eyepiece lens, based on at least one of: the gaze-tracking data, the gaze direction of the given eye;

estimating distortions per pixel or per group of pixels in an image, based on the relative position of the pupil, the relative orientation of the pupil and distortion information indicative of distortion caused by the eyepiece lens;

identifying an image segment whose pixels' or groups of pixels' estimated distortions are higher than a predefined threshold distortion;

modifying the image by replacing the pixels of the identified image segment with black pixels or near-black pixels; and utilising the modified image for display to the given eye via the at least one light source.

9. The method of claim 8, the method comprising:

detecting when the relative orientation of the pupil is greater than a predefined angle;

when it is detected that the relative orientation of the pupil is greater than the predefined angle,
   determining a gaze point in the image, based on the gaze direction of the given eye; and
   when identifying the image segment, considering a given image segment whose pixels' angular distance from the gaze point is greater than a pre-determined angular distance and whose pixels' or groups of pixels' estimated distortions are higher than the predefined threshold distortion as the identified image segment.

10. The method of claim 8, the method comprising collecting the distortion information indicative of the distortion caused by the eyepiece lens during calibration of the display apparatus.

11. The method of claim 8, wherein the at least one light source is at least one display comprising a backlight, wherein the method comprises dimming a brightness of a part of the backlight that corresponds to the identified image segment of the image.

12. The method of claim 8, wherein when modifying the image, the method comprises replacing additional pixels that lie in a proximity of a first edge of the identified image segment with black pixels or near-black pixels, the first edge being closer to a gaze point than a second edge of the identified image segment that is opposite to the first edge, wherein a density of the additional pixels that are replaced decreases on going away from the first edge.

13. The method of claim 12, wherein the at least one light source is at least one display comprising a backlight, the method comprising:

dimming a brightness of a part of the backlight that corresponds to the identified image segment of the image; and dimming a brightness of an additional part of the backlight that corresponds to the additional pixels, wherein said part of the backlight is dimmed to a greater extent than the additional part of the backlight.

14. The method of claim 8, wherein said image is a virtual-reality (VR) image, the display apparatus further comprising at least one video-see-through (VST) camera, wherein the method comprises:

determine a region in a field of view of the at least one VST camera corresponding to the identified image segment of the image;

skip reading out from the determined region in the field of view of the at least one VST camera, whilst reading out image data from a remaining region in the field of view of the at least one VST camera;

process the image data to generate a VST image;

generate an extended-reality (XR) image by utilising the VST image and the VR image; and display the XR image via the at least one light source.

* * * * *